US011124181B2

(12) United States Patent
Yoon et al.

(10) Patent No.: US 11,124,181 B2
(45) Date of Patent: Sep. 21, 2021

(54) VEHICLE CONTROL APPARATUS, A SYSTEM INCLUDING THE SAME, AND A METHOD THEREOF

(71) Applicants: HYUNDAI MOTOR COMPANY, Seoul (KR); KIA MOTORS CORPORATION, Seoul (KR)

(72) Inventors: Dae Joong Yoon, Hwaseong-Si (KR); Kyung Soo Ha, Pohang-si (KR); Sun Wo Jung, Suwon-si (KR); Jin Ho Park, Hwaseong-si (KR); Wan Seok Yang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 294 days.

(21) Appl. No.: 16/025,765

(22) Filed: Jul. 2, 2018

(65) Prior Publication Data
US 2019/0299981 A1    Oct. 3, 2019

(30) Foreign Application Priority Data

Apr. 2, 2018 (KR) .................. 10-2018-0038114

(51) Int. Cl.
*G05D 1/00* (2006.01)
*B60W 30/09* (2012.01)
(Continued)

(52) U.S. Cl.
CPC ............ *B60W 30/09* (2013.01); *B60W 50/16* (2013.01); *G05D 1/0011* (2013.01); *G05D 1/0055* (2013.01); *G05D 1/021* (2013.01);
*G08G 1/162* (2013.01); *G08G 1/166* (2013.01); *B60W 2050/143* (2013.01); *B60W 2710/30* (2013.01)

(58) Field of Classification Search
CPC ................. B60W 30/09; B60W 50/16; B60W 2050/143; B60W 2710/30; B60W 30/00; B60W 50/14; G08G 1/162; G08G 1/166; B60Q 9/008
See application file for complete search history.

(56) References Cited

U.S. PATENT DOCUMENTS

| 6,292,725 | B1* | 9/2001 | Kageyama | G08G 1/20 701/23 |
|---|---|---|---|---|
| 2014/0241579 | A1* | 8/2014 | Nonaka | G06K 9/3241 382/103 |

(Continued)

FOREIGN PATENT DOCUMENTS

| JP | 2013-239015 A | 11/2013 |
|---|---|---|
| KR | 10-2013-0118116 A | 10/2013 |

(Continued)

*Primary Examiner* — Genna M Mott
(74) *Attorney, Agent, or Firm* — Morgan, Lewis & Bockius LLP

(57) ABSTRACT

A vehicle control device includes a processor configured to determine a danger of collision between a user located within a specific distance from a first vehicle and a second vehicle that is traveling, warn the danger of collision through the first vehicle or a user terminal of the user according to the danger of collision, or control movement of the first vehicle, or transmit warning information to the second vehicle, and a storage configured to store information calculated by the processor.

20 Claims, 16 Drawing Sheets

(51) Int. Cl.
    *B60W 50/16*    (2020.01)
    *G08G 1/16*     (2006.01)
    *G05D 1/02*     (2020.01)
    *B60W 50/14*    (2020.01)

(56) References Cited

U.S. PATENT DOCUMENTS

| | | | |
|---|---|---|---|
| 2014/0297121 A1 | 10/2014 | Seo | |
| 2018/0151077 A1* | 5/2018 | Lee | B60Q 9/008 |
| 2019/0051061 A1* | 2/2019 | Battles | G05D 1/0088 |
| 2019/0114920 A1* | 4/2019 | Hilnbrand | G08G 1/162 |
| 2019/0118801 A1* | 4/2019 | Noh | G06K 9/00805 |
| 2019/0202442 A1* | 7/2019 | Lavoie | H04B 17/318 |
| 2019/0258247 A1* | 8/2019 | Bando | G05D 1/0016 |
| 2019/0329729 A1* | 10/2019 | Hilligardt | B60W 50/0098 |

FOREIGN PATENT DOCUMENTS

| | | |
|---|---|---|
| KR | 10-2014-0118611 A | 10/2014 |
| KR | 10-2014-0130824 A | 11/2014 |
| KR | 10-1459855 B1 | 11/2014 |
| KR | 10-2014-0139218 A | 12/2014 |

* cited by examiner

VEHICLE CONTROL APPARATUS, A SYSTEM INCLUDING THE SAME, AND A METHOD THEREOF

CROSS-REFERENCE TO RELATED APPLICATION

This application is based on and claims the benefit of priority to Korean Patent Application No. 10-2018-0038114, filed on Apr. 2, 2018, in the Korean Intellectual Property Office, the disclosure of which is incorporated herein in its entirety by reference.

TECHNICAL FIELD

The present disclosure relates to a vehicle control apparatus, a system including the same, and a method thereof, and more particularly, to a technology of protecting a user who performs a remote vehicle control outside a vehicle.

BACKGROUND

In recent years, the remote control technologies of controlling parking or pulling out vehicles in remote sites have been distributed. The user (driver) controls movement of a vehicle (host vehicle) by using a remote controller from the outside of the vehicle to remotely control the vehicle, and the user is located at a distance from the vehicle, that is, outside the vehicle.

In this way, when the user is located on the road for a remote vehicle control, there is a high possibility of the user colliding with a surrounding vehicle.

Accordingly, it is difficult for the user to concentrate on a remote control because the user has to perform a remote control while carefully watching the surroundings during the remote control, and collision accidents between the users and the surrounding vehicles may frequently occur because the surrounding vehicles recognize the user located between a lot of vehicles parked in large-scale parking lots, for example, of high buildings and shopping malls.

SUMMARY

Embodiments of the present disclosure provide a vehicle control apparatus that may prevent a collision accident of a user by a surrounding vehicle when the user remotely control a vehicle from the outside of the vehicle and minimize a traffic jam by performing a remote vehicle control in consideration of movement of surrounding vehicles.

The technical objects of the present disclosure are not limited to the above-mentioned one, and the other unmentioned technical objects will become apparent to those skilled in the art from the following description.

In accordance with an aspect of the present disclosure, a vehicle control device may include a processor configured to determine a danger of collision between a user located within a specific distance from a first vehicle and a second vehicle that is traveling, warn the danger of collision through the first vehicle or a user terminal of the user according to the danger of collision, or control movement of the first vehicle, or transmit warning information to the second vehicle, and a storage configured to store information calculated by the processor.

In a remote vehicle control mode, the first vehicle may include a remote control target vehicle of the user, and the second vehicle may include a surrounding vehicle that travels in a direction approaching the first vehicle.

The processor may be configured to calculate a location and a movement route of the user located outside the first vehicle, calculate a movement route and a vehicle speed of the second vehicle, and determine the danger of collision of the user based on the calculated location and movement route of the user and the calculated movement route and vehicle speed of the second vehicle.

The processor may be further configured to determine the danger of collision again in consideration of a gazing direction of the user's eye.

The processor may be further configured to transmit a warning command to perform at least one of outputting a vibration, outputting a warning screen, and outputting a warning sound through the user terminal of the user, when the danger of collision is a specific reference value or more.

The processor may be further configured to control at least one of outputting a warning sound of the first vehicle, turning-on/off of an emergency lamp of the first vehicle, turning-on/off of a headlamp of the first vehicle, and outputting a horn of the first vehicle.

The processor may be further configured to stop the first vehicle, controls movement of the first vehicle in a direction that is opposite to a target movement direction of the first vehicle, or control movement of the first vehicle in a direction between the user and the second vehicle when the danger of collision is a specific reference value or more.

The processor may be further configured to correct a target route of the first vehicle such that the first vehicle does not collide with the second vehicle when the first vehicle travels to a target route for parking during the remote vehicle control mode and the danger of collision of the first vehicle and the second vehicle is determined to be present.

The corrected target route of the first vehicle may include a route in which the first vehicle is maximally moved to a parking space such that the second vehicle passes without collision.

When the danger of collision of the first vehicle and the second vehicle disappears, the processor may be further configured to generate a compensation route for parking to a target parking location of the first vehicle to park the first vehicle at the target parking location according to the compensation route.

The processor may be further configured to increase a target vehicle speed of the first vehicle such that the first vehicle does not collide with the second vehicle when the danger of collision between the first vehicle and the second vehicle is present when the first vehicle travels to a target route for parking during the remote vehicle control mode.

The processor may be further configured to store image data of surroundings of the first vehicle in the storage when the danger of collision is a specific reference value or more.

The processor may be further configured to transmit a user collision danger warning command to the second vehicle through vehicle-to-vehicle communication when the danger of collision is a specific reference value or more.

The user collision danger warning command may include at least one of first vehicle state information, a warning sound output command through the second vehicle, a vibration output command through the second vehicle, a warning screen output command through the second vehicle, a haptic warning output command through the second vehicle, a movement control command of the second vehicle, and a braking device control command of the second vehicle.

In accordance with another aspect of the present disclosure, there is provided a vehicle control system including a detection device configured to acquire surrounding information around a first vehicle, and a vehicle control device configured to determine a danger of collision between a user located within a specific distance from the first vehicle and a second vehicle that is traveling based on the first vehicle surrounding information, warn the danger of collision through the first vehicle or a user terminal of a user according to the danger of collision, control movement of the first vehicle, or transmit warning information to the second vehicle.

The detection device may include at least one of a camera, an ultrasonic sensor, and a radar sensor.

In accordance with another aspect of the present disclosure, a method for controlling a vehicle may include determining, by a processor, a danger of collision between a user located within a specific distance from a first vehicle and a second vehicle that is traveling, and warning, by the processor, the danger of collision through the first vehicle or a user terminal of a user according to the danger of collision, or controlling movement of the first vehicle, or transmitting warning information to the second vehicle.

The determining of the danger of collision may include calculating a location and a movement route of the user and calculating a movement route and a vehicle speed of the second vehicle, and determining the danger of collision of the user based on the calculated location and movement route of the user, and the calculated movement route and vehicle speed of the second vehicle.

The warning of the danger of collision through the first vehicle or the user terminal of the user according to the danger of collision, or the controlling of the movement of the first vehicle, or transmitting the warning information to the second vehicle may include controlling at least one of outputting a warning sound of the first vehicle, turning-on/off of an emergency lamp of the first vehicle, turning-on/off of a headlamp of the first vehicle, and outputting a horn of the first vehicle, correcting a target route or a target vehicle speed of the first vehicle such that the first vehicle does not collide the second vehicle, or stopping the first vehicle, controlling movement of the first vehicle in a direction that is opposite to a target movement direction of the first vehicle, controlling movement of the first vehicle in a direction between the user and the second vehicle, or transmitting a user collision danger warning command to the second vehicle.

The warning of the danger of collision through the first vehicle or the user terminal of the user according to the danger of collision, or the controlling of the movement of the first vehicle, or transmitting the warning information to the second vehicle may include storing image data obtained by photographing surroundings of the first vehicle when the danger of collision is a specific reference value or more.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
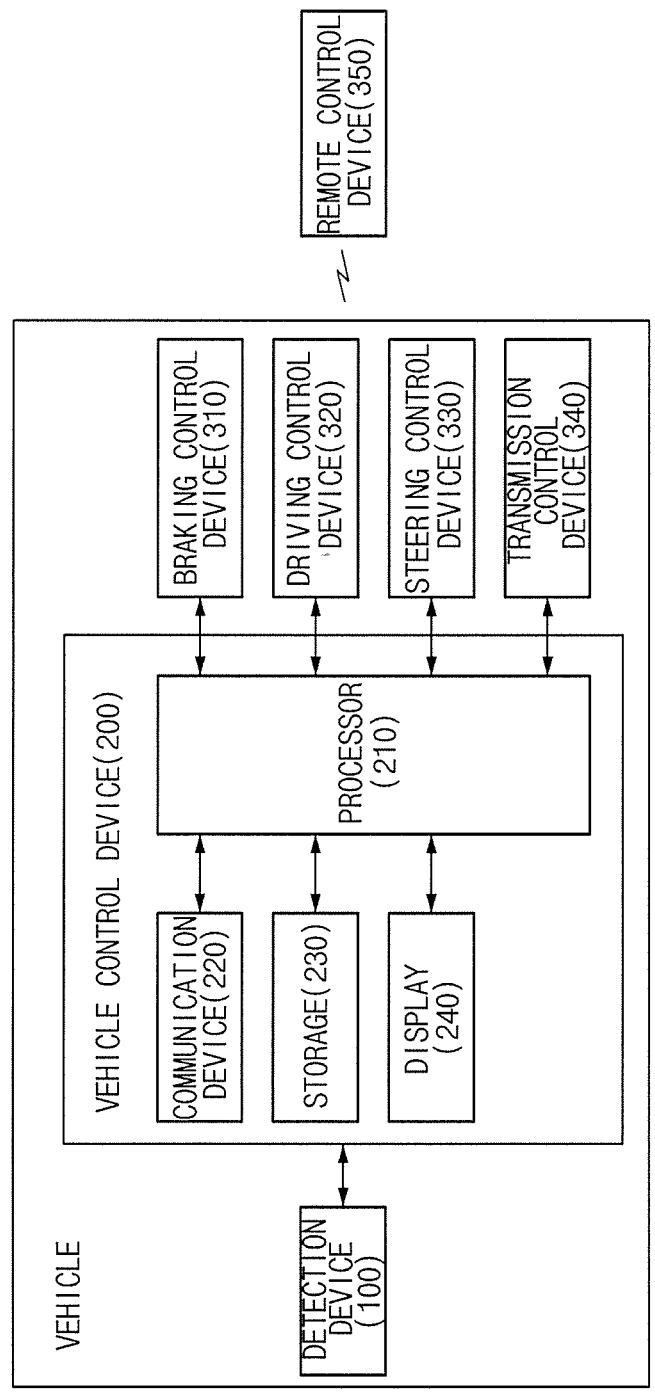
FIG. 1 is a block diagram of a vehicle control system according to an embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, exemplary embodiments of the present disclosure will be described in detail with reference to FIGS. 1 to 16.

FIG. 1 is a block diagram of a vehicle control system according to an embodiment of the present disclosure.

Referring to FIG. 1, a vehicle control system according to an embodiment may include a vehicle including a detection device 100, a vehicle control device 200, a braking control device 310, a driving control device 320, a steering control device 330, and a transmission control device 340, and a remote control device 350. Then, the detection device 100 and the vehicle control device 200 of FIG. 1 may be mounted on the vehicle, and the remote control device 350 may be carried by the user. Then, the user may remotely control a host vehicle (a first vehicle) in a state in which the user is located within a specific distance from the host vehicle, and the vehicle control device 200 may perform a warning or control for preventing collision of the user with a surrounding vehicle (a second vehicle) that is traveling around the host vehicle.

The detection device 100 includes one or more cameras, one or more ultrasonic sensors, and one or more radar sensors, and may be mounted on a front side, a rear side, and lateral sides of the vehicle. The detection device 100 detects a user and a surrounding vehicle around the vehicle, and delivers the detection result to the vehicle control device 200. Then, the detection device 100 may be realized by using a camera, an ultrasonic sensor, or a radar sensor, which is mounted on the vehicle in advance for an advanced driver assistance system (ADAS). An example of mounting the detection device 100 on the vehicle and a detection range of the detection device 100 will be described later with reference to FIGS. 2 and 3.

The vehicle control device 200 controls the host vehicle or a surrounding vehicle to warn a danger of collision or prevent a collision by determining a danger of collision of the user outside the host vehicle and the surrounding vehicle when the user remotely controls parking or pulling-out of the host vehicle through a remote control device 350 outside the host vehicle. An example of controlling the host vehicle or the surrounding vehicle to warn a danger of collision or prevent a collision will be described later in detail with reference to FIGS. 4 to 13.

Further, the detection device 100 may be configured to detect information on the host vehicle and the surrounding vehicle. The detection device 100 may detect various pieces of information, such as location, speed, and acceleration of the host vehicle and the surrounding vehicle. The detection device 100, for example, may include a radar, a lidar, an acceleration sensor, a yaw rate sensor, a torque measuring sensor, and/or a wheel speed sensor.

The vehicle control device 200 may determine a danger of collision of the user located outside the host vehicle and the surrounding vehicle in a remote vehicle control mode, and may control the host vehicle or provide a warning or a movement control command to the surrounding vehicle according to a danger of collision. To achieve this, the vehicle control device 200 may include a processor 210, a communication device 220, a storage 230, and a display 240. Hereinafter, the host vehicle is a target vehicle of which parking or pulling-out the user controls through the remote control device 350, and the surrounding vehicle may include a surrounding vehicle that travels towards the user or the host vehicle.

The processor 210 may be electrically connected to the detection device 100. The processor 210 may control the detection device 100, and may be an electric circuitry that executes instructions of software which thereby perform various data processing and calculations described hereinafter.

The processor 210 may determine a danger of collision of the user located outside the host vehicle and the surrounding vehicle in a remote vehicle control mode, and may provide a warning to the remote control device 350, may control the host vehicle, may provide a warning to the surrounding vehicle, or may provide a surrounding vehicle movement control command according to the danger of collision The processor 210 calculates a location of the user located outside the host vehicle and a movement route of the user, and calculates a movement route and a vehicle speed of the surrounding vehicle. Subsequently, the processor 210 may determine a danger of collision of the user (or a time to collision (TTC)) by using the location of the user, the movement route of the user, the movement route of the surrounding vehicle, and the vehicle speed of the surrounding vehicle. Then, the processor 210 may determine a danger of collision again in consideration of the direction of the eyes of the user. That is, the processor 210 may readjust the danger of collision to be higher when the direction of the eyes of the user and the progress direction of the surrounding vehicle coincide with each other, and may readjust the danger of collision to be lower when the direction of the eyes of the user and the progress direction of the surrounding vehicle do not coincide with each other. Then, the processor 210 may determine the danger of collision by updating the location of the user, the movement route of the user, the movement route of the surrounding vehicle, and the vehicle speed of the surrounding vehicle in real time.

The processor 210 transmits a user collision danger warning command to the remote control device 350 of the user when the danger of collision is a predetermined reference value or more. Then, the warning command may include at least one of an output of vibration, an output of a warning screen, and an output of a warning sound through the remote control device. Accordingly, the user may recognize a possibility of collision of the user and the surrounding vehicle through the remote control device 350 carried by the user, and may avoid a collision.

Further, the processor 210 may allow the user to recognize a danger of collision of the user by outputting a warning sound of the host vehicle, switching on or off an emergency lamp of the host vehicle, switching on or off a head lamp of the host vehicle, or blowing a horn of the host vehicle when the danger of collision is a predetermined reference value or more.

The processor 210 may stop movement of the host vehicle, move the host vehicle in a direction that is opposite to a target movement direction of the host vehicle, or move the host vehicle in a direction that travels round the user, that is, a direction between the user and the surrounding vehicle to protect the user when the danger of collision is a reference value or more.

The processor 210 may correct a target route of the host vehicle such that the host vehicle does not collide with the surrounding vehicle when it is determined that a danger of collision of the surrounding vehicle and the host vehicle is present while the host vehicle travels to a target route for parking in the remote vehicle control mode. Then, the processor 210 may correct the target route to a route along which the host vehicle maximally enters a parking space such that the surrounding vehicle passes without colliding with the host vehicle.

The processor 210 may control movement of the host vehicle such that the host vehicle may be parked at an original target location by generating a compensation route for parking of the host vehicle if the danger of collision of the host vehicle and the surrounding vehicle disappears.

When there is a danger of collision of a surrounding vehicle and the host vehicle while the host vehicle travels along a target route for parking in a remote vehicle control mode, the processor 210 may promptly park the host vehicle at a parking location before the surrounding vehicle reaches the current location of the host vehicle by increasing a target vehicle speed of the host vehicle such that the host vehicle does not collide the surrounding vehicle.

The processor 210 may store image data around the host vehicle in the storage 230 when a danger of collision is a predetermined reference value or more to help accurately estimate an accident situation based on the stored image data when a collision accident occurs.

The processor 210 may transmits a user collision danger warning command to the surrounding vehicle when the danger of collision is the predetermined reference value or more. Accordingly, the surrounding vehicle may output a collision danger warning screen on a display device such as a cluster thereof, output a collision danger warning sound, or output collision danger warning vibration in a steering wheel or a seat according to the collision danger warning command received from the host vehicle. Accordingly, the driver of the surrounding vehicle may recognize a front user that is performing a remote control or a danger of collision with a vehicle that is being parked (or pulled out). Then, the collision danger warning command transmitted from the host vehicle to the surrounding vehicle may include host vehicle state information, a warning sound output command through the surrounding vehicle, a vibration output command, a warning screen output command, a haptic warning output command, a movement control command of a second vehicle, and a braking device control command of the second vehicle. That is, the vehicle control device 200 may transmit a command signal for operating a braking device of the surrounding vehicle to the surrounding vehicle.

The communication device 220 performs communication with the surrounding vehicle, and to achieve this, the communication device 220 may include various communication units, such as a vehicle-to-vehicle (V2V) communication unit, a mobile communication unit, a ZigBee module that is a Bluetooth module, a short range communication unit such as an NEC module, and a Wi-Fi unit.

The storage 230 stores image data around the vehicle captured through a camera of the detection device 100 and a detection result detected through an ultrasonic sensor or a radar sensor. The storage 230 may include a memory, such as a flash memory type, a hard disk type, a micro type, or a card type (for example, a secure digital (SD) card or an eXtream digital (XD) card), and a storage medium of at least one of memories, such as a random access memory (RAM), a static RAM (SRM), a read-only memory (RCM), a programmable ROM (PROM), an electrically erasable PROM (EEPROM), a magnetic RAM (MRAM), a magnetic disk, and an optical disk.

The display 240 may display location information of a user outside the host vehicle, a location of the surrounding vehicle, a movement route of the user, information on a danger of collision of the user outside the host vehicle and the surrounding vehicle, a collision danger warning screen, and the like. The display 240 may include at least one of a liquid crystal display (LCD), a thin film transistor (TFT) LCD, a light emitting diode (LED), an organic LED, an active matrix OLED (AMOLED), a flexible display, a bended display, and a 3D display. Among them, some displays may be realized by transparent displays that are configured in a transparent or light-transmitting way such that the outside is visible. Further, the display 130 may be provided as a touchscreen including a touch panel to be used as an input device as well as an output device.

The braking control device 310, the driving control device 320, the steering control device 330, and the transmission control device 340 controls braking, driving, steering, and transmission of the vehicle under the control of the vehicle control device 200.

The remote control device 350 may control forward movement, rearward movement, parking, and pulling-out of the vehicle outside the vehicle. Further, the remote control device 350 remotely control turning-on/off of a headlamp of the vehicle, turning-on/off of an emergency lamp, turning-on/off of a horn, and opening or closing of a door of the vehicle.

The remote control device (user terminal) 350 may include a FOB key, a smartphone, a tablet personal computer (PC), a mobile phone, a video phone, an e-book reader, a netbook computer, a personal digital assistant (PDA), a portable multimedia player (PMP), a mobile communication terminal, and an electronic notebook, and may include all devices in which a vehicle remote control application may be installed. Further, the remote control device 350 is equipped with a vehicle linked application that interworks with the display 240 in the vehicle. The vehicle associated application may be downloaded through wireless communication or the internet, and may be automatically installed after being downloaded.

The vehicle control device 200 of FIG. 1 may be applied to a remote smart parking assist system or an autonomous parking system.

Figure 2:
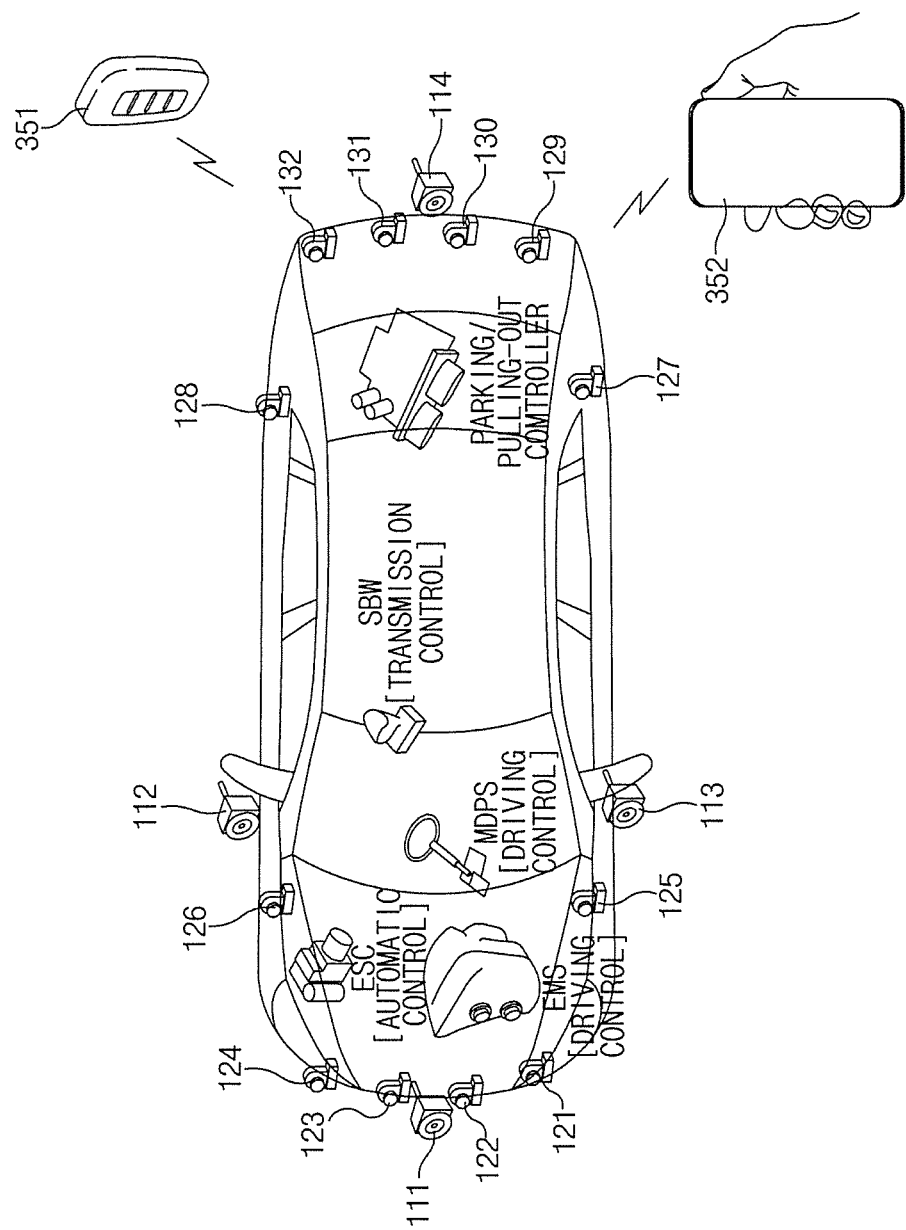
FIG. 2 is a view illustrating a location of a detection device in a vehicle according to an embodiment of the present disclosure.
Figure 3:
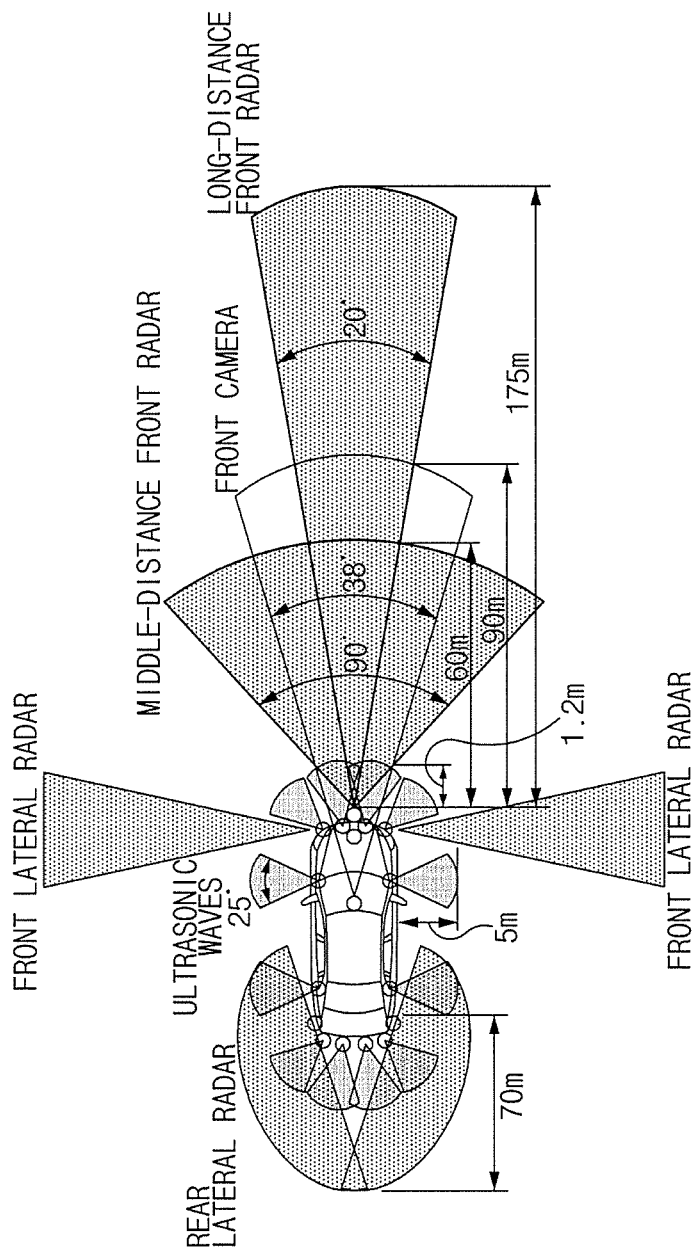
FIG. 3 is a view illustrating a detection range of a detection device according to an embodiment of the present disclosure.

FIG. 2 is a view illustrating a location of a detection device in a vehicle according to an embodiment of the present disclosure. FIG. 3 is a view illustrating a detection range of a detection device according to an embodiment of the present disclosure.

Referring to FIG. 2, the detection device 100 includes a plurality of cameras 111 to 114 and a plurality of ultrasonic sensors 121 to 132. The plurality of cameras 111 to 114 are mounted on a front side, opposite lateral sides, and a rear side of the vehicle to photograph the surroundings of the front side, the lateral sides, and the rear side of the vehicle. The plurality of ultrasonic sensors 121 to 132 are mounted on a front side, front lateral sides, rear lateral sides, and a rear side of the vehicle, and detects locations and/or kinds (for example, a surrounding vehicle, a pedestrian, a bicycle, and a motorcycle) of obstacles on the front side, the front lateral sides, the rear lateral sides, and the rear side of the vehicle to acquire information.

Meanwhile, although FIG. 2 illustrates that the plurality of cameras 111 to 114 and the plurality of ultrasonic sensors 121 to 132 are included, the present disclosure is not limited thereto, and the detection device 100 may include a larger number of sensors and cameras and may include other kinds of sensors, such as a radar sensor, a laser scanner, and/or a corner radar. Then, the remote control device 350 may include a smart key 351 or a smartphone 352.

Referring to FIG. 3, detection ranges of the plurality of cameras, the plurality of radar sensors, and the plurality of ultrasonic sensors are illustrated. The present disclosure may detect not only an obstacle that is close to the host vehicle but also an obstacle that is distant from the host vehicle by using the plurality of cameras, the plurality of radar sensors, and the plurality of ultrasonic sensors.

Figure 4:
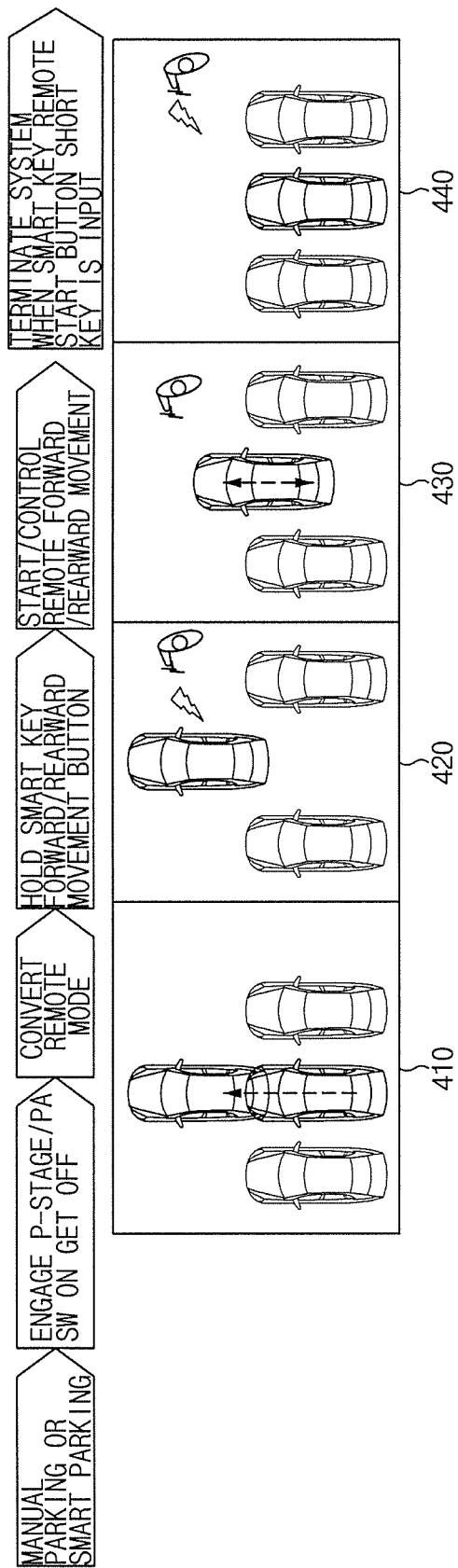
FIG. 4 is a view illustrating a process of controlling remote parking of a vehicle according to an embodiment of the present disclosure.

FIG. 4 is a view illustrating a process of controlling remote parking of a vehicle according to an embodiment of the present disclosure.

Referring to FIG. 4, during manual parking or smart parking of the vehicle, after the user gets off the vehicle in a state in which a transmission gear is located in stage P (a parking gear stage) and a parking switch PA SW is turned on, the remote control device 350 turns on a remote control mode (410). Then, the vehicle control device 200 of the present disclosure is turned on. The host vehicle is parked at a preset parking location by holding a forward/rearward movement button of the smart key that is a remote control device (420) and performing a remote forward/rearward entrance control (430). Accordingly, after the parking of the vehicle is completed, the remote control is terminated by shortly pressing the smart key remote start button by the user (440). Then, although FIG. 4 discloses an example of a parking control by a remote forward or rearward movement, the present disclosure is not limited thereto and various parking controls, such as rectangular parking and parallel parking, may be performed through a remote control. Further, the user is located within a specific radius from the host vehicle. The vehicle control device 200 automatically performs driving, braking, transmission, and start control of the vehicle by controlling the driving control device, the braking control device, the transmission control device, and the start control device according to a request of the remote control device 350 outside the vehicle.

Figure 5:
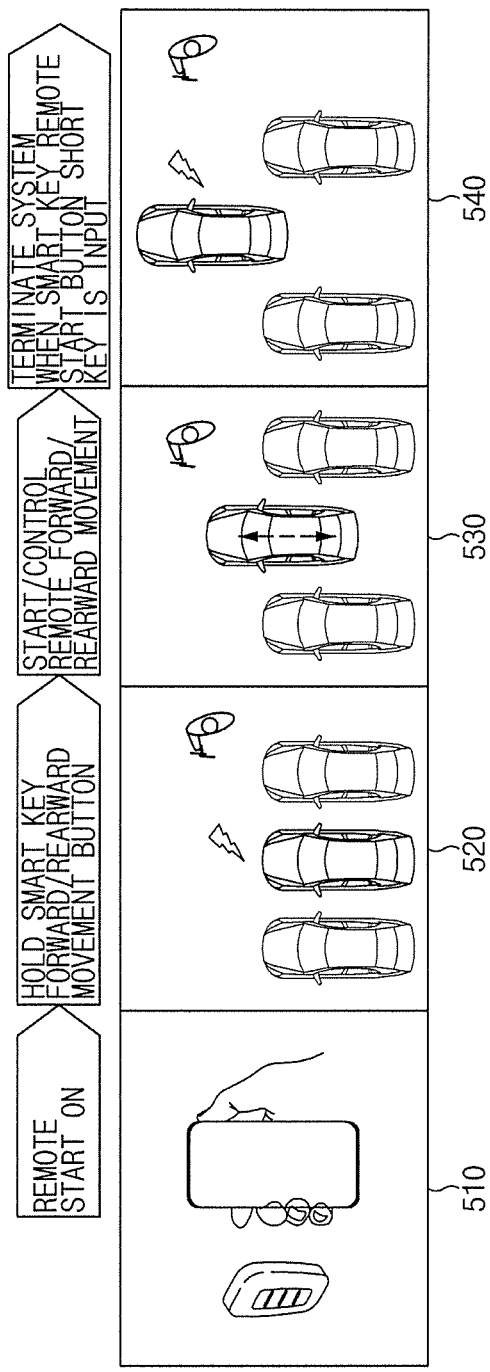
FIG. 5 is a view illustrating a process of controlling remote pulling-out of a vehicle according to an embodiment of the present disclosure.

FIG. 5 is a view illustrating a process of controlling remote pulling-out of a vehicle according to an embodiment of the present disclosure. Referring to FIG. 5, if the user turns on the remote start button of the remote control device 350 at a location outside the host vehicle to pull out a parked vehicle (510), a remote forward/rearward movement control is performed (530) after the smart key forward/rearward movement button is held (520). Subsequently, if the remote start button of the remote control device 350 is shortly pressed (a short key is input) by the user after the pulling-out of the vehicle is completed, the remote control mode is completed (540).

Figure 6:
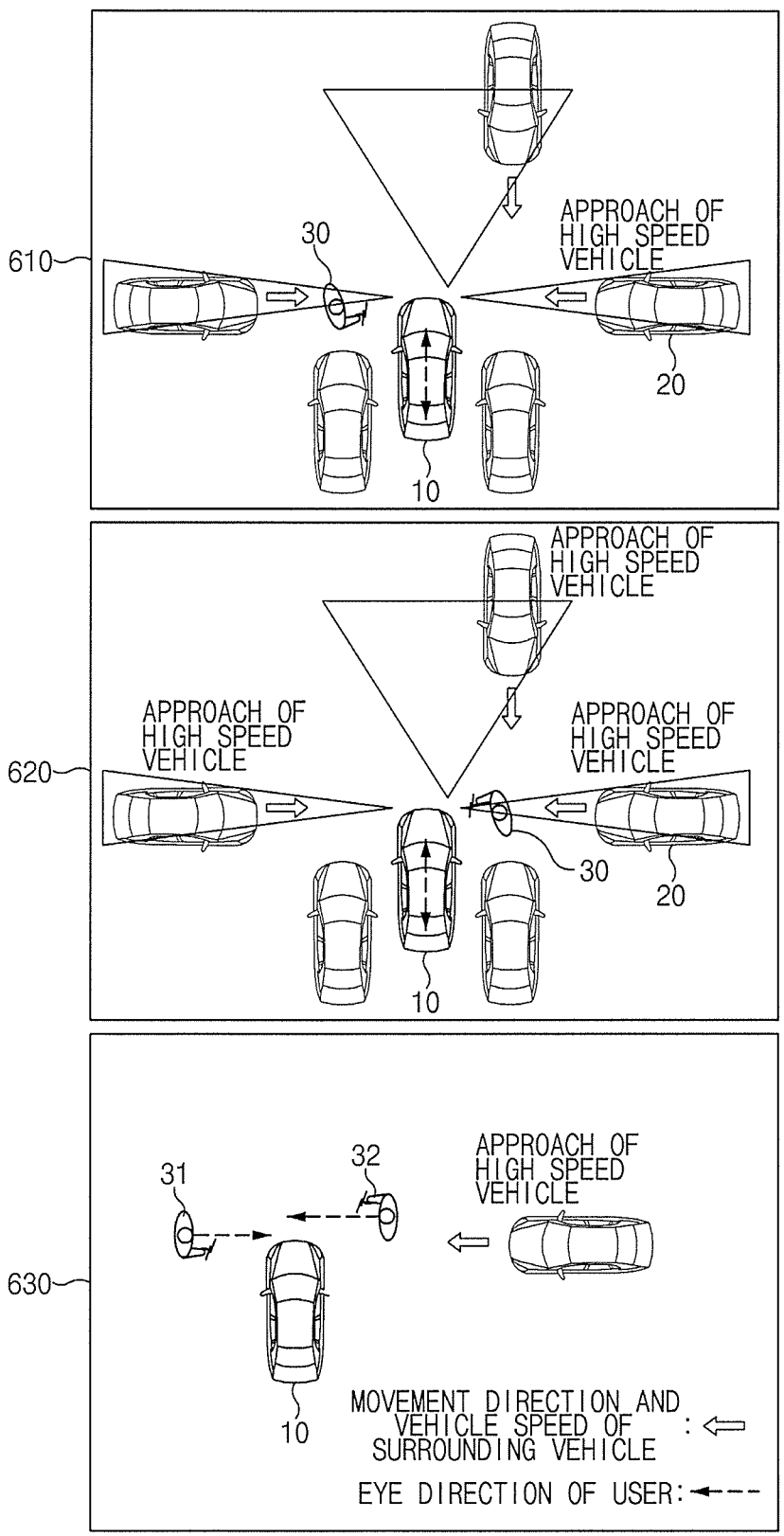
FIG. 6 is a view illustrating a method of determining a danger of collision of a user outside a host vehicle and a surrounding vehicle according to an embodiment of the present disclosure.

FIG. 6 is a view illustrating a method of determining a danger of collision of a user 30 outside a host vehicle 10 and a surrounding vehicle 20 according to an embodiment of the present disclosure.

Referring to FIG. 6, an example in which the user 30 approaches the surrounding vehicle 20 from the front side, the right side, and the left side of the host vehicle 10 while controlling a forward movement or a rearward movement of the host vehicle 10 through a remote control device from the outside of the host vehicle 10.

Reference numeral 610 indicates a situation in which the user 30 is located on the left side of the host vehicle 10 and views the right side, and reference numeral 620 indicates a situation in which the user 30 is located on the right side of the host vehicle 10 and vies the right side. Reference numeral 630 indicates a progress direction of the surrounding vehicle 20 and eye gazing directions of the users 31 and 32.

Figure 7:
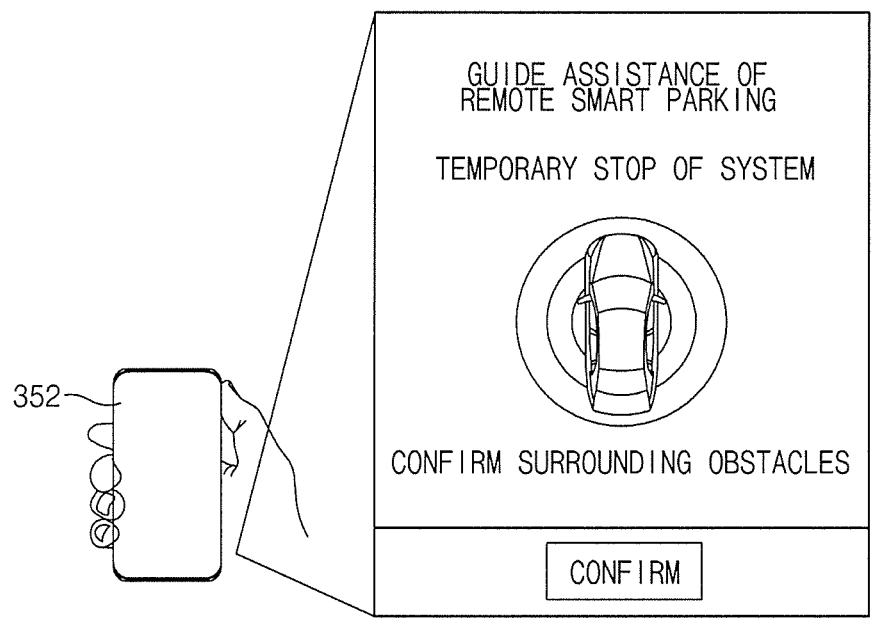
FIG. 7 is an exemplary view of a process of warning a collision danger through a user terminal according to an embodiment of the present disclosure.

FIG. 7 is an exemplary view of a process of warning a collision danger through a user terminal according to an embodiment of the present disclosure.

FIG. 7 illustrates an example of outputting a screen that warns the user located outside the host vehicle of a danger of collision with the surrounding vehicle through the smartphone 352 that is carried by the user, and allows the user to recognize a danger of collision through the warning screen. Then, the smartphone 352 may output a warning vibration and a warning sound together with a warning screen. Further, in addition to the warning screen illustrated in FIG. 7, the warning screen may be constituted in various forms. For example, the smartphone 352 may variously realize the warning screen, for example, by displaying the whole screen with a red color to turn on or off the screen or displaying an accident screen. Further, although FIG. 7 illustrates a screen of a smartphone as an example, a warning screen, a warning sound, and a vibration may be output on screens of all the user terminals realized as the remote control device 350.

In this way, the vehicle control device 200 of the present disclosure may allow the user to recognize a dangerous situation to protect the user, by outputting a warning sound, a warning vibration, and a warning screen through the remote control device (a smartphone, a smart key, or a PDA) carried by the user.

Figure 8:
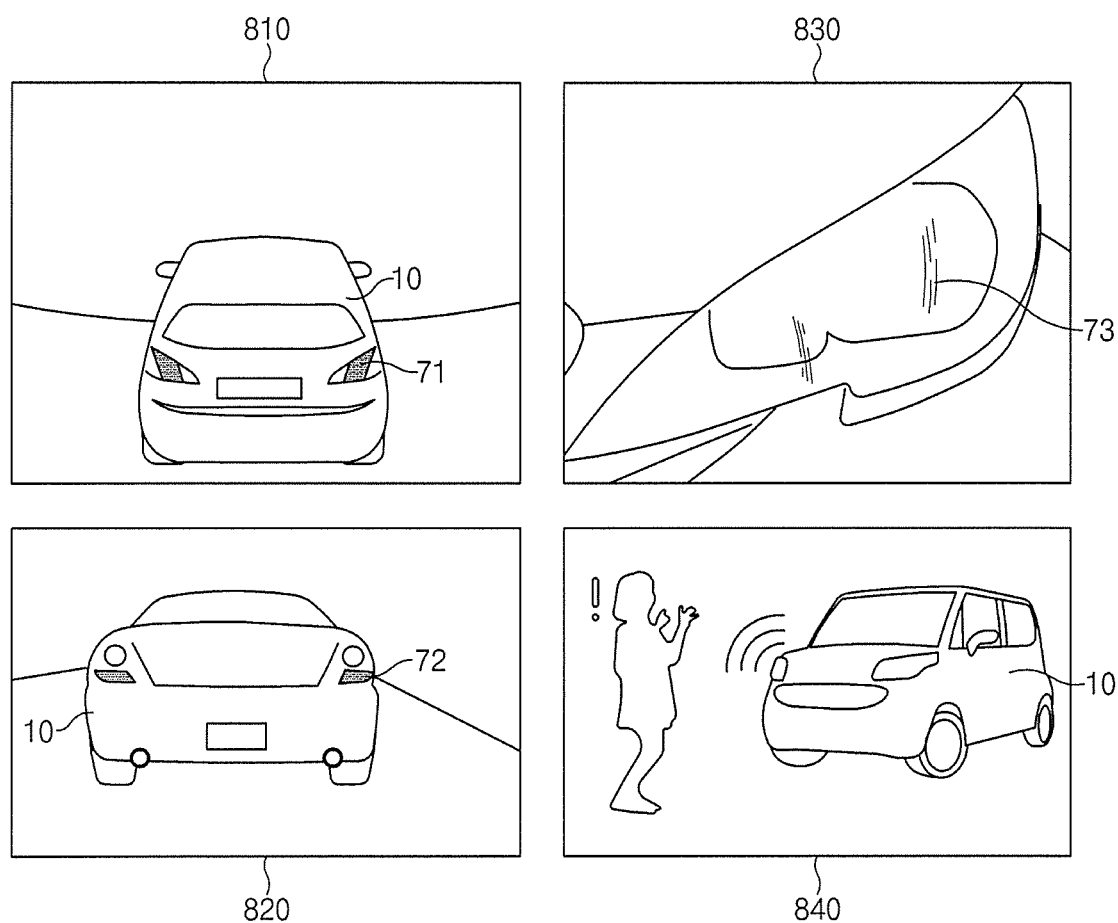
FIG. 8 is an exemplary view of a process of warning a user through a warning device of a host vehicle according to an embodiment of the present disclosure.

FIG. 8 is an exemplary view of a process of warning a user through a warning device of a host vehicle 10 according to an embodiment of the present disclosure.

Reference numerals 810 and 820 of FIG. 8 indicates examples of allowing the user located in a short range from the host vehicle 10 to recognize a danger of collision with a surrounding vehicle that travels toward the user by turning on or off the emergency lamps 71 and 72 of the host vehicle 10. Reference numeral 830 indicates an example of allowing the user located in a short range from the host vehicle 10 to recognize a danger by turning on or off a headlamp 73 of the host vehicle 10. Reference numeral 840 indicates an example of outputting a voice or a warning sound through an external sound output device of the host vehicle 10 or outputting a horn of the host vehicle 10.

In this way, the vehicle control device 200 of the present disclosure allows the user located outside the host vehicle 10 to recognize a danger by outputting an emergency lamp, a headlamp, a horn, and a warning sound of the host vehicle 10 to the outside.

Figure 9:
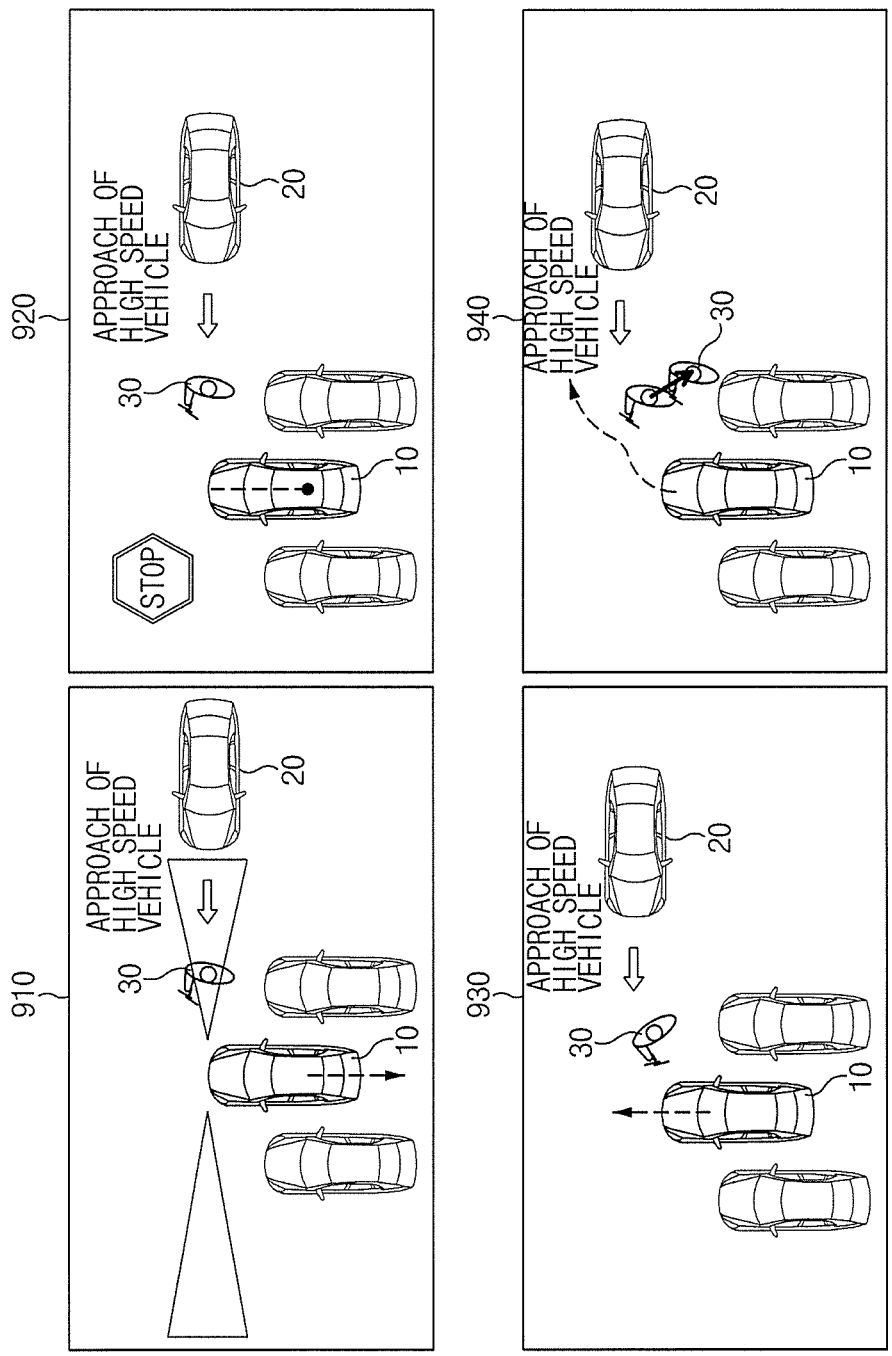
FIG. 9 is an exemplary view of a control of movement of a host vehicle for protecting a driver according to an embodiment of the present disclosure.

FIG. 9 is an exemplary view of a control of movement of a host vehicle 10 for protecting a driver according to an embodiment of the present disclosure.

Reference numeral 910 of FIG. 9 indicates an example in which the surrounding vehicle 20 approaches the user 30 at a high speed in a remote control mode (remote parking mode) of the host vehicle 10. Reference numeral 920 indicates an example of allowing an approaching surrounding vehicle 20 to recognize the host vehicle 10 and the user 30 by stopping the host vehicle 10 before the host vehicle 10 arrives at a parking location during a remote control (during parking) of the host vehicle 10. Reference numeral 930 indicates an example of exciting or warning an approaching surrounding vehicle 20 to allow the surrounding vehicle 20 to recognize the host vehicle 10 and the user 30 by moving the host vehicle 10 in a direction that is opposite to a target movement direction for parking during a remote parking control through the remote control mode of the host vehicle 10. Reference numeral 940 indicates that the host vehicle 10 moves round the user 30 and moves between the user 30 and the surrounding vehicle 20. Then, as the host vehicle 10 moves, the user 30 may deviates from a travel route of the surrounding vehicle 20.

In this way, the vehicle control device 200 of the present disclosure may protect the user 30 from an approaching surrounding vehicle 20 by stopping the host vehicle 10, moving the host vehicle 10 in a direction that is opposite to the target movement direction for parking, and moving the host vehicle 10 to a location at which the user 30 may be protected.

Figure 10:
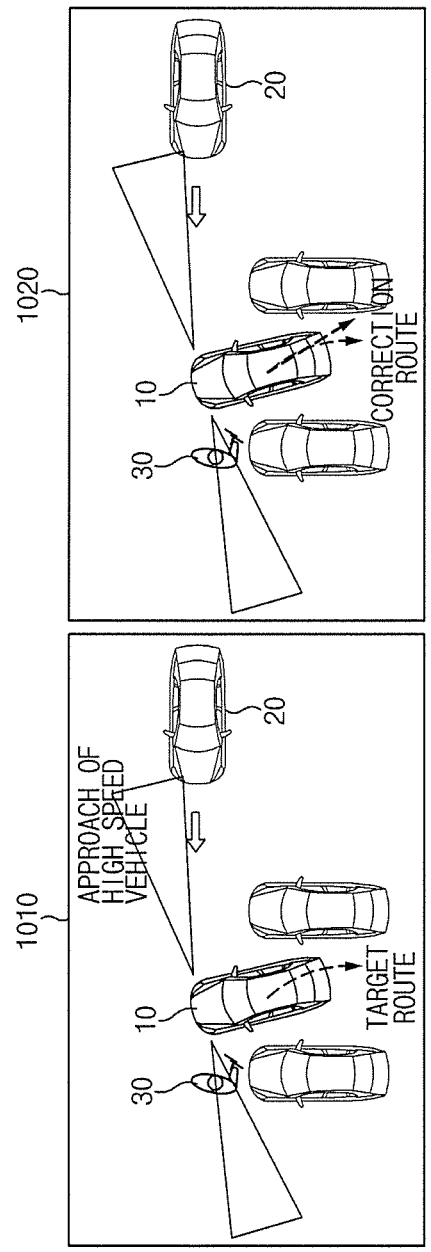
FIG. 10 is an exemplary view of a control of movement of a host vehicle for protecting a driver according to an embodiment of the present disclosure.

FIG. 10 is an exemplary view a control of movement of a host vehicle 10 for protecting a driver according to an embodiment of the present disclosure.

Reference numeral 1010 of FIG. 10 indicates an example in which the surrounding vehicle 20 approaches the user 30 at a high speed while the host vehicle 10 moves in a target route for remote parking through a remote control. Reference numeral 1020 indicates an example in which the host vehicle 10 moves deep to a parking location through a correction route obtained by correcting the target route of the host vehicle 10 for smooth driving of the surrounding vehicle 20 to prevent the route of the surrounding vehicle 20 from being obstructed.

Figure 11:
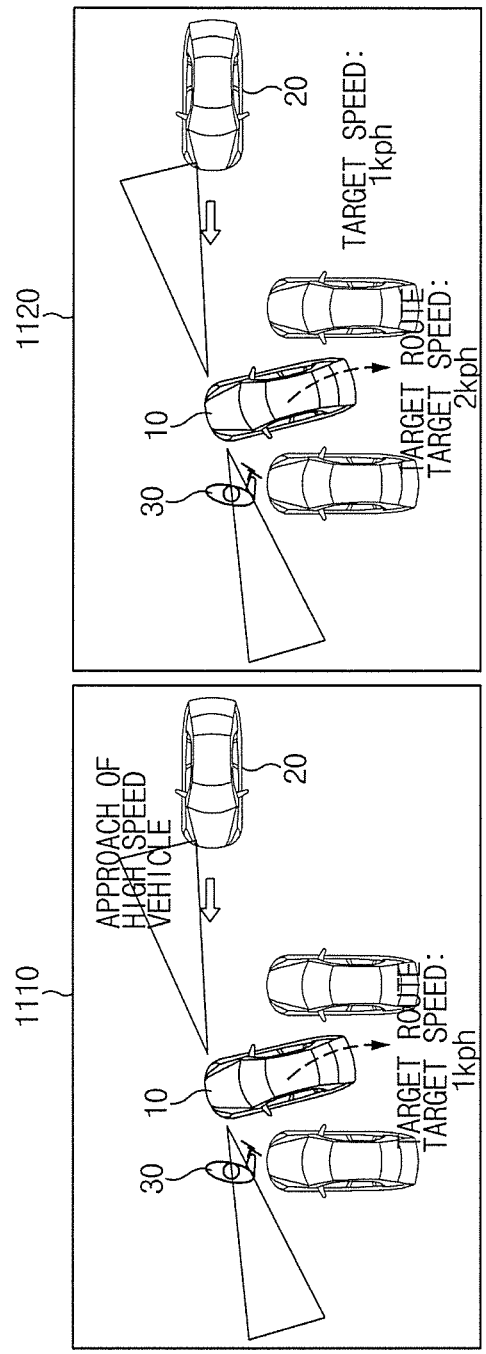
FIG. 11 is an exemplary view a control of movement of a host vehicle for protecting a driver according to an embodiment of the present disclosure.

FIG. 11 is an exemplary view a control of movement of a host vehicle 10 for protecting a driver according to an embodiment of the present disclosure.

Reference numeral 1110 of FIG. 11 indicates an example in which the surrounding vehicle 20 approaches the user 30 at a high speed while the host vehicle 10 moves in a target route at a target speed of 1 kph for remote parking through a remote control. Reference numeral 1120 indicates an example in which the target speed of the host vehicle 10 increases for smooth driving of the surrounding vehicle 20 to complete the remote parking at 2 kph such that the host vehicle 10 may be parked promptly to prevent the route of the surrounding vehicle 20 from being obstructed.

As illustrated in FIGS. 10 and 11, when the target route is corrected, the vehicle control device 200 controls the host vehicle 10 to be accurately parked at a targeted parking location by generating a compensation route if a danger of collision with the surrounding vehicle 20 disappears.

Figure 12:
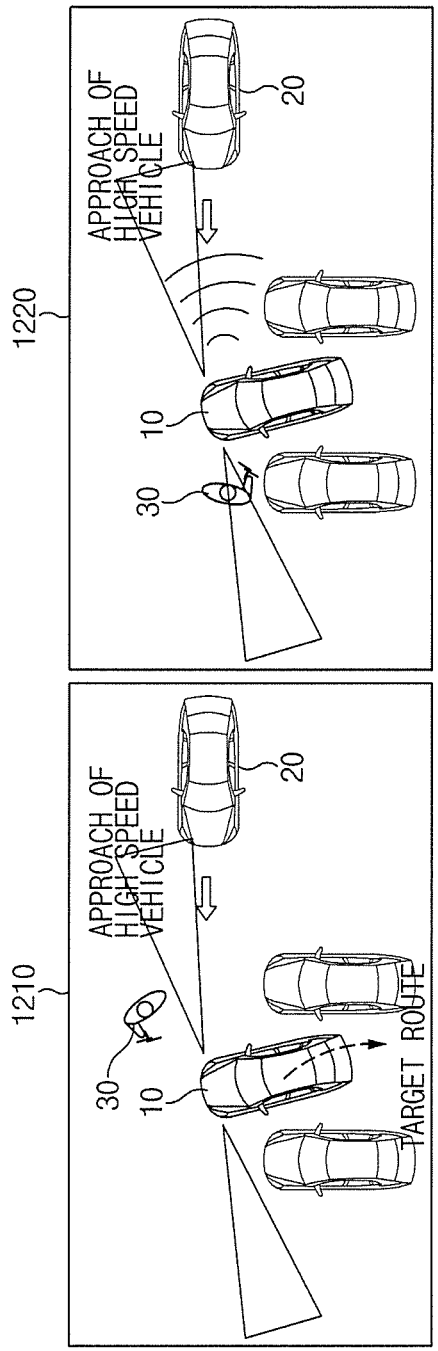
FIG. 12 is an exemplary view of a control of a surrounding vehicle for protecting a driver according to an embodiment of the present disclosure.

FIG. 12 is an exemplary view of a control of a surrounding vehicle for protecting a driver according to an embodiment of the present disclosure.

Reference numeral 1210 of FIG. 12 indicates an example in which the surrounding vehicle 20 approaches the user 30 at a high speed while the host vehicle 10 moves in a target route for remote parking through a remote control. Reference numeral 1220 indicates an example of transmitting a signal that warns a danger of collision with the host vehicle 10 or the user 30 and the surrounding vehicle 20 through wireless communication to the surrounding vehicle 20. That is, the host vehicle 10 and the surrounding vehicle 20 may perform vehicle-to-vehicle communication, and the host vehicle 10 may transmit a warning command and state information of the host vehicle 10 that is being parked or pulled out through the vehicle-to-vehicle (V2V) to the surrounding vehicle 20. Then, the surrounding vehicle 20 may output a warning sound, a warning lamp, and a warning phrase through an audio visual device or a haptic device, such as a vehicle cluster and an audio video navigation device.

As illustrated in FIGS. 10 to 12, the vehicle control device 200 of the present disclosure prevents the travel of the surrounding vehicle 20 from being obstructed, by corroding the target route or the target speed of the host vehicle 10 when the surrounding vehicle 20 approaches the host vehicle 10 during remote parking. Further, the vehicle control device 200 of the present disclosure may minimize a danger of an accident by providing state information and warning information of the host vehicle 10 to the surrounding vehicle 20 through wireless communication with the surrounding vehicle 20.

Figure 13:
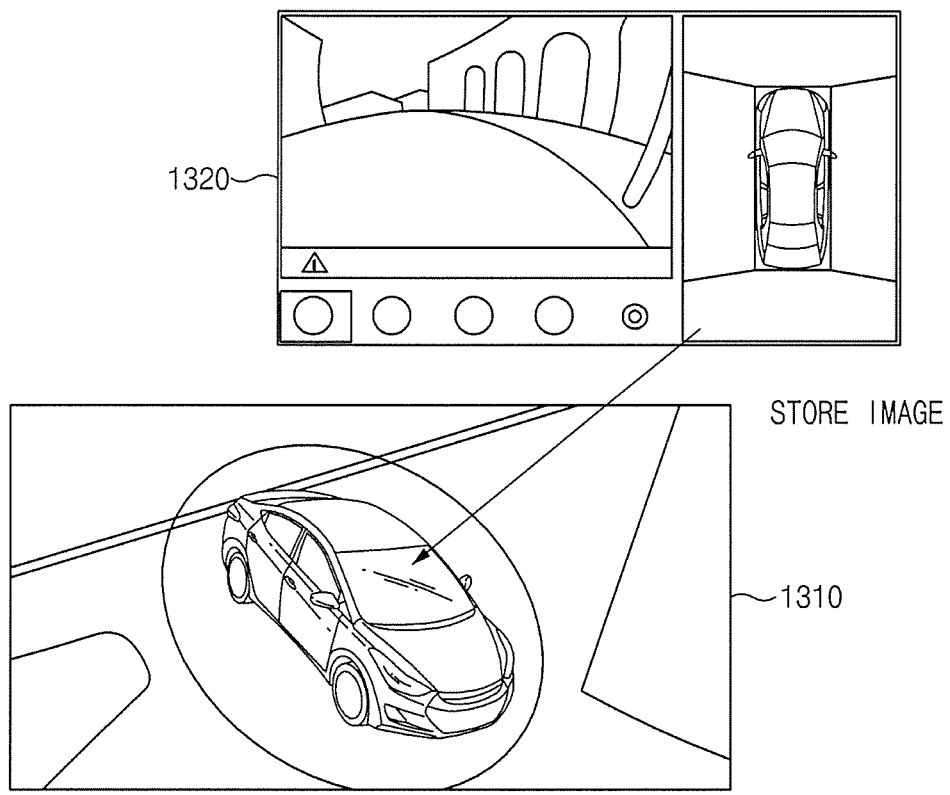
FIG. 13 is an exemplary view illustrating a process of storing an image that considers collision of a driver according to an embodiment of the present disclosure.

FIG. 13 is an exemplary view illustrating a process of storing an image that considers collision of a driver according to an embodiment of the present disclosure. Reference numeral 1310 of FIG. 13 indicates an exemplary view of a vehicle including a storage, and reference numeral 1320 indicates an exemplary view of an image stored in the storage.

As illustrated in FIG. 13, the vehicle control device 200 may accurately determine a cause of an accident based on the image stored in the storage when an accident occurs, by capturing and storing an image around the host vehicle 10 when a danger of a collision is present.

Figure 14:
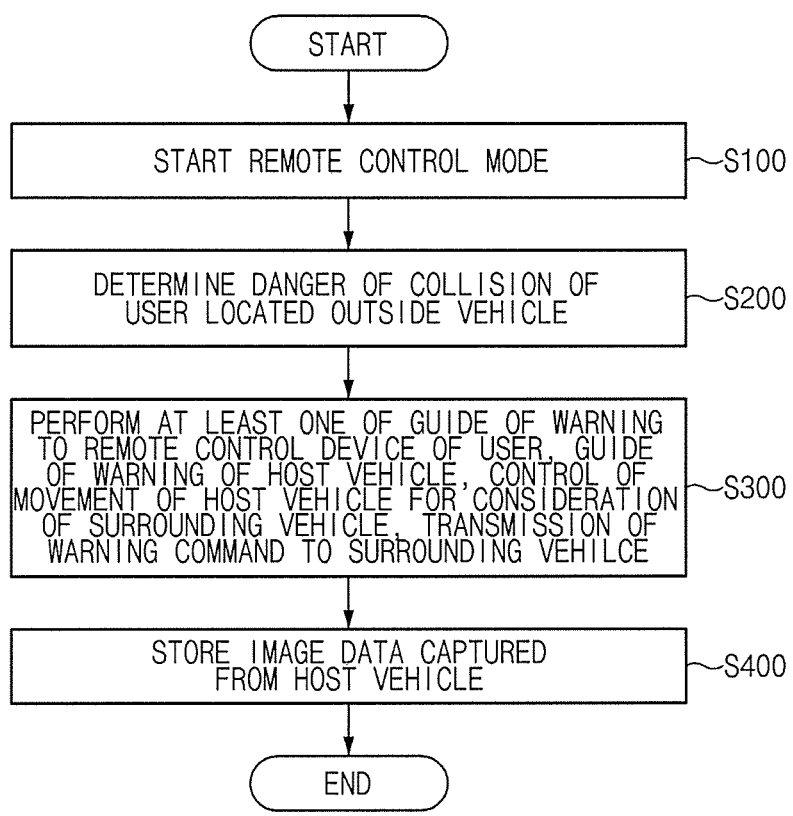
FIG. 14 is a flowchart illustrating a method for controlling a vehicle according to an embodiment of the present disclosure.

FIG. 14 is a flowchart illustrating a method for controlling a vehicle according to an embodiment of the present disclosure. The method for controlling a vehicle according to the embodiment of the present disclosure will be described in detail with reference to FIG. 14. Hereinafter, it is assumed that the vehicle control device 200 of FIG. 1—performs a process of FIG. 15. Further, in a description of FIG. 15, an operation described to be performed by the device may be understood to be controlled by the processor 210 of the device 200.

Referring to FIG. 14, the vehicle control device 200 determines a danger of collision of the user located outside the vehicle and the surrounding vehicle that approaches the user (S200) if a remote control mode is started through communication with the remote control device 350 (S100).

Subsequently, the vehicle control device 200 transmits a collision danger warning command to the remote control device 350 against the danger of collision, or performs a guide of a warning of a danger of collision through the host vehicle, a control of movement of the host vehicle for consideration of the surrounding vehicle, a control of movement of the host vehicle for protection of the user, and transmission of a warning command to the surrounding vehicle. Then, at least one of the guide of a warning of a danger of collision through the host vehicle may be performed (S300).

Subsequently, the vehicle control device 200 stores image data obtained by photographing the host vehicle.

Figure 15:
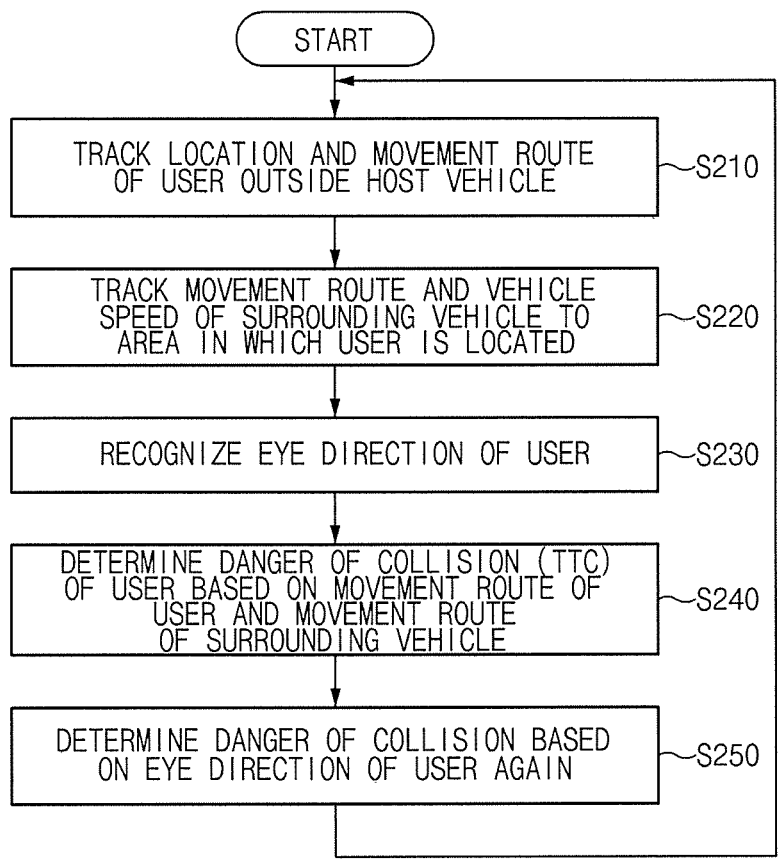
FIG. 15 is a flowchart illustrating a method for determining a danger of collision of a user according to an embodiment of the present disclosure.

FIG. 15 is a flowchart illustrating a method for determining a danger of collision of a user according to an embodiment of the present disclosure. Hereinafter, it is assumed that the device 200 of FIG. 1 performs a process of FIG. 15. Further, in a description of FIG. 15, an operation described to be performed by the device may be understood to be controlled by the processor 210 of the device 200.

Referring to FIG. 15, the vehicle control device 200 tracks a location of the user outside the host vehicle and a movement path. Subsequently, a movement route and a vehicle speed of the surrounding vehicle are tracked in an area in which the user is located (S220).

Thereafter, the vehicle control device 200 recognizes an eye direction of the user (S230). Then, the vehicle control device 200 may recognize an eye direction of the user through the detection device 100 of the vehicle.

The vehicle control device 200 determines a danger of collision of the user (TTC) based on the movement route of the user and the movement route of the surrounding vehicle (S240).

The vehicle control device 200 determines a danger of collision based on the eye direction of the user (S250). That is, because the user may not recognize the surrounding vehicle if the eye direction of the user and the travel direction of the surrounding vehicle are the same, the danger of collision may be readjusted to be higher, and because the user may recognize the surrounding vehicle with a high possibility if the eye direction of the user and the travel direction of the surrounding vehicle are not the same, the danger of collision may be readjusted to be lower.

Figure 16:
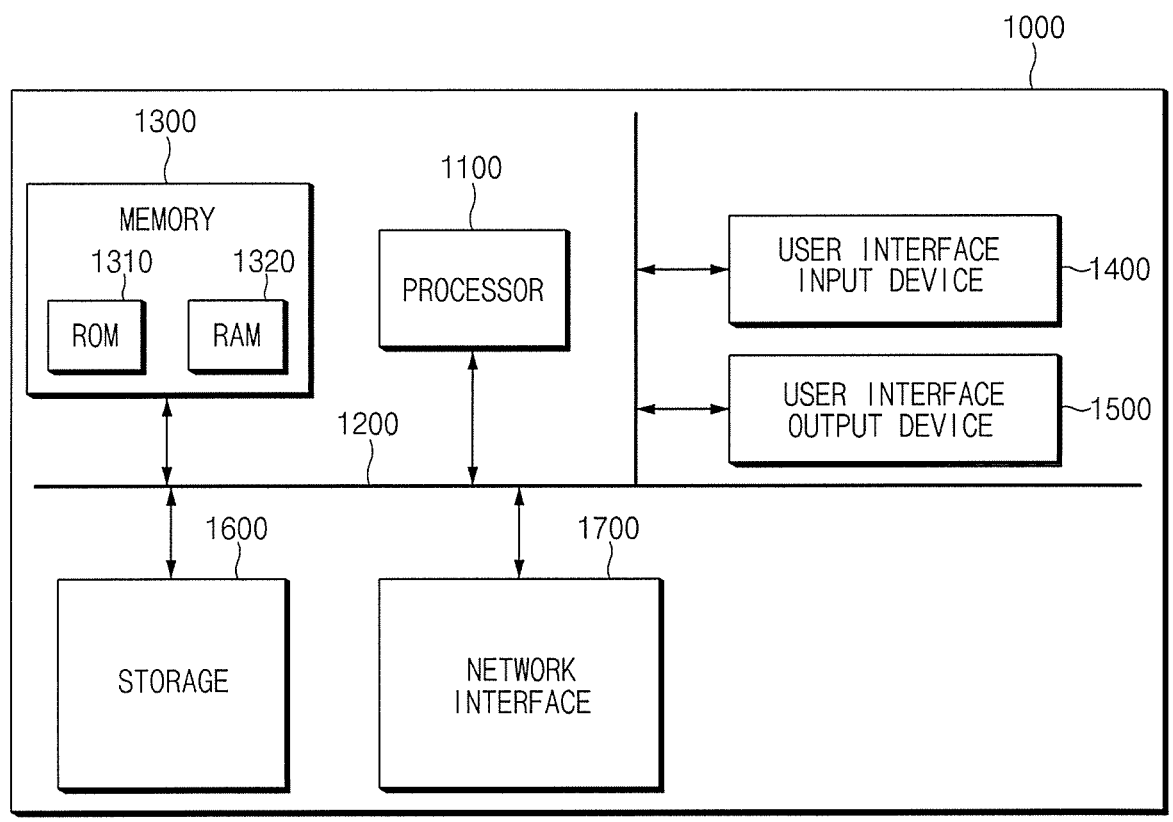
FIG. 16 is a diagram of a computer system to which the method for controlling a vehicle according to an embodiment of the present disclosure is applied.

FIG. 16 is a diagram of a computer system to which the method for controlling a vehicle according to an embodiment of the present disclosure is applied.

Referring to FIG. 16, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present technology may prevent a collision accident by a surrounding vehicle that approaches the user when the user remotely control a vehicle from the outside of the vehicle and may minimize a traffic jam as a remote vehicle control is performed in consideration of movement of the surrounding vehicle.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A vehicle control device comprising:
    a processor configured to:
        determine a danger of collision between a user located within a specific distance from a first vehicle and a second vehicle that is traveling toward the first vehicle or the user when a remote control mode of the first vehicle is started through a communication with a remote control device of the user, warn the danger of collision through the first vehicle and the remote control device of the user according to the danger of collision,
        control movement of the first vehicle, and
        transmit warning information and state information of the first vehicle that is being parked or pulled out to the second vehicle; and
    a storage configured to store information calculated by the processor,
    wherein the warning information includes a movement control command of the second vehicle or a braking device control command of the second vehicle, and
    wherein the processor is further configured to control movement of the first vehicle in a direction between the user and the second vehicle when a condition is met.

2. The vehicle control device of claim 1, wherein in a remote vehicle control mode, the first vehicle includes a remote control target vehicle of the user, and the second vehicle includes a surrounding vehicle that travels in a direction approaching the first vehicle.

3. The vehicle control device of claim 1, wherein the processor is further configured to calculate a location and a movement route of the user located outside the first vehicle, calculate a movement route and a vehicle speed of the second vehicle, and determine the danger of collision of the user based on the calculated location and movement route of the user and the calculated movement route and vehicle speed of the second vehicle.

4. The vehicle control device of claim 3, wherein the processor is further configured to re-determine the danger of collision in consideration of a gazing direction of the user's eye.

5. The vehicle control device of claim 1, wherein the processor is further configured to transmit a warning command to perform at least one of outputting a vibration, outputting a warning screen, and outputting a warning sound through the remote control device of the user, when the danger of collision is a specific reference value or more.

6. The vehicle control device of claim 1, wherein the processor is further configured to control at least one of outputting a warning sound of the first vehicle, turning-on/off an emergency lamp of the first vehicle, turning-on/off a headlamp of the first vehicle, and outputting a horn of the first vehicle.

7. The vehicle control device of claim 1, wherein the processor is further configured to stop the first vehicle, control movement of the first vehicle in a direction that is opposite to a target movement direction of the first vehicle, when the danger of collision is a specific reference value or more.

8. The vehicle control device of claim 1, wherein the processor is further configured to correct a target route of the first vehicle such that the first vehicle does not collide with the second vehicle, when the first vehicle travels to a target route for parking during a remote vehicle control mode and a danger of collision between the first vehicle and the second vehicle is determined to be present.

9. The vehicle control device of claim 8, wherein the corrected target route of the first vehicle includes a route in which the first vehicle is moved to a parking space such that the second vehicle passes without collision.

10. The vehicle control device of claim 8, wherein when the danger of collision between the first vehicle and the second vehicle disappears, the processor is further configured to generate a compensation route for parking to a target parking location of the first vehicle and park the first vehicle at the target parking location according to the compensation route.

11. The vehicle control device of claim 1, wherein the processor is further configured to increase a target vehicle speed of the first vehicle such that the first vehicle does not collide with the second vehicle, when a danger of collision between the first vehicle and the second vehicle is present when the first vehicle travels to a target route for parking during the remote vehicle control mode.

12. The vehicle control device of claim 1, wherein the processor is further configured to store image data of surroundings of the first vehicle in the storage, when the danger of collision is a specific reference value or more.

13. The vehicle control device of claim 1, wherein the processor is further configured to transmit a user collision danger warning command to the second vehicle through vehicle-to-vehicle communication, when the danger of collision is a specific reference value or more.

14. The vehicle control device of claim 13, wherein the user collision danger warning command includes at least one of the state information of the first vehicle, a warning sound output command through the second vehicle, a vibration output command through the second vehicle, a warning screen output command through the second vehicle, or a haptic warning output command through the second vehicle.

15. A vehicle control system comprising:
a detection device configured to acquire surrounding information around a first vehicle; and
a vehicle control device configured to:
determine a danger of collision between a user located within a specific distance from the first vehicle and a second vehicle that is traveling toward the first vehicle or the user based on the acquired surrounding information when a remote control mode of the first vehicle is started through a communication with a remote control device of the user,
warn the danger of collision through the first vehicle and the remote control device of the user according to the danger of collision,
control movement of the first vehicle, and
transmit warning information and state information of the host vehicle that is being parked or pulled out to the second vehicle,
wherein the warning information includes a movement control command of the second vehicle or a braking device control command of the second vehicle,
wherein the vehicle control device is further configured to control movement of the first vehicle in a direction between the user and the second vehicle when a condition is met.

16. The vehicle control device of claim 15, wherein the detection device includes at least one of a camera, an ultrasonic sensor, and a radar sensor.

17. A method for controlling a vehicle, the method comprising:
determining, by a processor, a danger of collision between a user located within a specific distance from a first vehicle and a second vehicle that is traveling when a remote control mode of the first vehicle is started through a communication with a remote control device of the user; and
warning, by the processor, the danger of collision through the first vehicle and the remote control device of the user according to the danger of collision,
controlling, by the processor, movement of the first vehicle, and
transmitting, by the processor, warning information and state information of the host vehicle that is being parked or pulled out to the second vehicle,
wherein the warning information includes a movement control command of the second vehicle or a braking device control command of the second vehicle,
wherein the controlling movement of the first vehicle includes:
controlling movement of the first vehicle in a direction between the user and the second vehicle when a condition is met.

18. The method of claim 17, wherein the determining of the danger of collision includes:
calculating a location and a movement route of the user and calculating a movement route and a vehicle speed of the second vehicle; and
determining the danger of collision of the user based on the calculated location and movement route of the user and the calculated movement route and vehicle speed of the second vehicle.

19. The method of claim 17, wherein the warning of the danger of collision through the first vehicle or the remote control device of the user according to the danger of collision, or the controlling of the movement of the first vehicle, or transmitting the warning information to the second vehicle includes:
controlling at least one of outputting a warning sound of the first vehicle, turning-on/off of an emergency lamp of the first vehicle, turning-on/off of a headlamp of the first vehicle, and outputting a horn of the first vehicle;
correcting a target route or a target vehicle speed of the first vehicle such that the first vehicle does not collide the second vehicle; or
stopping the first vehicle, controlling movement of the first vehicle in a direction that is opposite to a target movement direction of the first vehicle, or transmitting a user collision danger warning command to the second vehicle.

20. The method of claim 17, wherein the warning of the danger of collision through the first vehicle or the remote control device of the user according to the danger of collision, or the controlling of the movement of the first vehicle, or transmitting the warning information to the second vehicle includes:
storing image data obtained by photographing surroundings of the first vehicle when the danger of collision is a specific reference value or more.

* * * * *